(12) United States Patent
Kirk et al.

(10) Patent No.: US 12,330,768 B2
(45) Date of Patent: Jun. 17, 2025

(54) ACOUSTIC PANEL

(71) Applicant: Safran Nacelles Limited, Burnley (GB)

(72) Inventors: Dave Kirk, Burnley (GB); Graeme Hill, Burnley (GB); Dave Hebden, Burnley (GB); Simon Furmston, Burnley (GB)

(73) Assignee: Safran Nacelles Limited (GB)

( * ) Notice: Subject to any disclaimer, the term of this patent is extended or adjusted under 35 U.S.C. 154(b) by 391 days.

(21) Appl. No.: 17/608,819

(22) PCT Filed: May 7, 2020

(86) PCT No.: PCT/GB2020/051121
§ 371 (c)(1),
(2) Date: Nov. 4, 2021

(87) PCT Pub. No.: WO2020/225563
PCT Pub. Date: Nov. 12, 2020

(65) Prior Publication Data
US 2022/0297818 A1  Sep. 22, 2022

(30) Foreign Application Priority Data
May 9, 2019  (GB) ..................... 1906537

(51) Int. Cl.
*B64D 33/02* (2006.01)
*B64C 1/40* (2006.01)
(Continued)

(52) U.S. Cl.
CPC ............... *B64C 1/40* (2013.01); *B64D 33/02* (2013.01); *F02C 7/045* (2013.01); *F02K 1/827* (2013.01);
(Continued)

(58) Field of Classification Search
CPC ............ F02C 7/045; F02C 7/24; F02K 1/827; B64D 2033/0206
See application file for complete search history.

(56) References Cited

U.S. PATENT DOCUMENTS 3,566,606 A * 3/1971 Mortlock ................ F02C 7/047
415/220
3,933,327 A   1/1976 Cook et al.
(Continued)

FOREIGN PATENT DOCUMENTS

EP   2241504 A2   10/2010
FR   2924409 A1   6/2009
(Continued)

OTHER PUBLICATIONS

Non Final Office Action for U.S. Appl. No. 17/766,852, mailed Jul. 26, 2023, 21 pages.
(Continued)

*Primary Examiner* — Forrest M Phillips
*Assistant Examiner* — Joseph James Peter Illicete
(74) *Attorney, Agent, or Firm* — Buchanan Ingersoll & Rooney PC

(57) ABSTRACT

An acoustic panel for an aircraft comprising: a sound attenuating sheet having a plurality of cavities, a sound attenuating sheet having a first surface, a second surface opposite to the first surface and an end surface connecting the first and second surfaces, a first sheet extending over at least a portion of the first surface and over the end surface, and a second sheet extending over the second surface and the end surface, wherein the first and the second sheets are connected such that a tensile force can be transferred therebetween.

10 Claims, 8 Drawing Sheets

(51) Int. Cl.
  *F02C 7/045* (2006.01)
  *F02K 1/82* (2006.01)
  *G10K 11/168* (2006.01)
(52) U.S. Cl.
  CPC .... *G10K 11/168* (2013.01); *B64D 2033/0206* (2013.01)

(56) References Cited

U.S. PATENT DOCUMENTS

| | | | |
|---|---|---|---|
| 4,738,416 | A | 4/1988 | Birbragher |
| 5,034,256 | A * | 7/1991 | Santiso, III ............... B32B 7/12 |
| | | | 428/116 |
| 5,101,621 | A | 4/1992 | Mutch |
| 5,251,435 | A | 10/1993 | Pauley |
| 6,123,170 | A | 9/2000 | Porte et al. |
| 6,129,311 | A | 10/2000 | Welch et al. |
| 7,938,224 | B2 * | 5/2011 | Frustie ................... B64D 33/02 |
| | | | 181/290 |
| 8,028,797 | B2 * | 10/2011 | Douglas ................. F02C 7/045 |
| | | | 181/292 |
| 8,534,029 | B2 * | 9/2013 | Leng .................... A47B 96/205 |
| | | | 52/796.11 |
| 8,602,360 | B2 | 12/2013 | Porte et al. |
| 8,800,714 | B2 * | 8/2014 | Ichihashi ............. G10K 11/172 |
| | | | 181/207 |
| 9,010,084 | B2 | 4/2015 | Chelin et al. |
| 9,168,716 | B2 * | 10/2015 | Benedetti ................ F02C 7/045 |
| 9,314,875 | B2 * | 4/2016 | Stephan ................... B21J 15/00 |
| 9,352,844 | B2 | 5/2016 | Porte et al. |
| 9,779,715 | B1 * | 10/2017 | Seldal ....................... B64C 1/40 |
| 9,927,374 | B2 * | 3/2018 | Safai ....................... G01B 11/24 |
| 10,112,361 | B2 | 10/2018 | Sumi et al. |
| 11,325,717 | B2 | 5/2022 | Porte et al. |
| 11,649,062 | B2 | 5/2023 | Porte et al. |
| 2008/0206044 | A1 | 8/2008 | Porte et al. |
| 2009/0101756 | A1 | 4/2009 | Cacciaguerra |
| 2010/0038475 | A1 | 2/2010 | Zecca et al. |
| 2010/0122868 | A1 | 5/2010 | Chiou et al. |
| 2011/0108357 | A1 * | 5/2011 | Vauchel .................. F02K 1/827 |
| | | | 181/222 |
| 2012/0048389 | A1 | 3/2012 | Chelin et al. |
| 2012/0261521 | A1 | 10/2012 | Porte et al. |
| 2014/0001248 | A1 | 1/2014 | Porte et al. |
| 2014/0077031 | A1 | 3/2014 | Benedetti et al. |
| 2014/0326536 | A1 | 11/2014 | Vauchel et al. |
| 2018/0297304 | A1 | 10/2018 | Weaver et al. |

FOREIGN PATENT DOCUMENTS

| | | |
|---|---|---|
| FR | 2954282 A1 | 6/2011 |
| FR | 3055612 A1 | 3/2018 |
| RU | 2027555 C1 | 1/1995 |
| WO | 2011123392 A2 | 10/2011 |

OTHER PUBLICATIONS

Great Britain Search Report for Great Britain Application No. 1914916.0, dated Jul. 28, 2020, 10 pages.
International Search Report and Written Opinion for International Application No. PCT/GB2020/052554, dated Dec. 8, 2020, 8 pages.
Great Britain Search Report for Great Britain Application No. 1906537.4, dated Oct. 18, 2015, 8 pages.
International Search Report and Written Opinion for International Application No. PCT/GB2020/051121, dated Jul. 24, 2020, 9 pages.
European Communication pursuant to Article 94(3) for European Application No. 20 726 916.8, dated Jul. 27, 2023, 6 pages.
Office Action (Communication pursuant to Article 94(3) (EPC) issued May 23, 2024, by the European Patent Office in corresponding European Patent Application No. 20 726 916.8. (7 pages).

* cited by examiner

ACOUSTIC PANEL

This application is a U.S. National Phase application of PCT International Application No. PCT/GB2020/051121, filed May 7, 2020, which claims the benefit of GB 1906537.4, filed May 9, 2019, both of which are incorporated by reference herein.

FIELD OF THE INVENTION

This invention relates to an acoustic panel and an air inlet cowling including such an acoustic panel.

BACKGROUND OF THE INVENTION

There is a desire to isolate sounds in one section of aircraft from other sections of the aircraft and/or the outside of the aircraft. This is particularly important for an aircraft nacelle, where noise generated by the engine and by airflow at the intake to the engine should be contained or attenuated in order to avoid excessive noise pollution.

Existing acoustic panels often involve a sound attenuating sheet positioned between two sheets, an inner and outer sheet, with one of these sheets having apertures to allow sound to enter the closed panel, but this arrangement often leads to difficulty in sealing the acoustic panel to adjacent panels, due to the abrasive nature of the sound attenuating sheets. Further, if a sound attenuating sheet having more than one layer is to be used, it may be beneficial to hold the multiple layers of the sound attenuating sheet together strongly.

The present invention may improve manufacturability and robustness.

SUMMARY OF THE INVENTION

A first aspect of the invention provides an acoustic panel for an aircraft comprising: a sound attenuating sheet comprising a plurality of cavities, the sound attenuating sheet having a first surface, a second surface opposite to the first surface and an end surface connecting the first and second surfaces, a first sheet extending over at least a portion of the first surface and over the end surface, and a second sheet extending over the second surface and the end surface, wherein the first and the second sheets are connected such that a tensile force can be transferred there between.

With such an arrangement, the arrangement of the connection of the first and second sheets allows the sound attenuating sheet to be held in compression and so the chance of separation of the sound attenuating sheet or of other damage to the sound attenuating sheet due to tensile stresses being generated therein is reduced.

The first and second sheets may prevent expansion of the sound attenuating sheet in a thickness direction of the sound attenuating sheet. The first and second surfaces of the sound attenuating sheet may thus be prevented from moving further apart.

Further, by having a portion of a sheet extending over the edge of the sound attenuating sheet, there is the prospect of improved sealing between the acoustic panel and an adjacent panel, feature or component.

The sound attenuating sheet may comprise two layers of sound attenuating sheets, each comprising a plurality of cavities, the two sound attenuating sheets being separated by a septum. By providing two separate layers of sound attenuating sheets, the acoustic panel can attenuate sound over a greater range of frequencies and may thereby provide improved sound insulation.

The sound attenuating sheets may be cellular sheets, such as honeycomb sheets, or in the case of a single sheet, the single sound attenuating sheet may be a cellular sheet such as a honeycomb sheet. By using a cellular sheet, the separate cells may act as Helmholtz resonators and thereby attenuate sound at particular frequencies.

The first sheet and the second sheet may form a single continuous sheet. By using a single sheet to cover the portions of the first and second surfaces of the sound attenuating sheet and the end surface of the sound attenuating sheet, a uniform tensile force can be applied to the sheet so that the sound attenuating sheet has a uniform compressive stress. There may also be provided a simpler overall arrangement, improving use of manufacture.

The acoustic panel may further comprise a third sheet, separate or discrete from the first and second sheets, extending over a portion of the first surface of the sound attenuating sheet and over a portion of the first sheet, the portion of the first sheet extending over the at least a portion of the first surface of the sound attenuating sheet. By using a third sheet, the acoustic panel may be more easily manufactured and the single continuous sheet may have a C shape, into which the sound attenuating sheet may be slid and the third sheet can be overlaid on the sound attenuating sheet and the portion of the single continuous sheet extending over the first surface of the sound attenuating sheet. Overall, this may provide a more easily manufactured acoustic panel since the sound attenuating sheet may be more easily slid into place.

The first sheet and the second sheet may overlap on the end surface of the sound attenuating sheet. This arrangement provides an alternative possible manufacturing method, in which the first and second sheets may be applied to the sound attenuating sheet at the same time, meaning that the sound attenuating sheet does not need to be slid over a sheet.

The first and/or second sheets may comprise an inspection hole through which the end surface of the sound attenuating sheet is visible. The provision of an inspection hole can allow a person manufacturing the acoustic panel to ensure that the sound attenuating sheet is correctly placed and may allow inspection of the sound attenuating sheet for detecting damage.

The acoustic panel may further comprise a seal or other close-out feature attached to the first and/or second sheet where the respective sheet extends over the end surface of the sound attenuating sheet, the seal being arranged to abut an adjacent panel. By attaching the seal directly to the sheet extending over the end surface, the convenient and non-abrasive qualities of the sheet at an end surface may be fully utilized, as opposed to attaching a seal to an adjacent panel.

The panel may be curved, such that the first surface is a radially outer surface and the second surface is a radially inner surface, the end surface having an annular or arcuate shape. This may improve the suitability of an acoustic panel for use on an aircraft nacelle or fuselage, by following the natural shape of those parts.

The second sheet may be air permeable at a location where it extends over the second surface. This may improve the function of the sound attenuating sheet, in particular when there are open cells within the sound attenuating sheet arranged to act as Helmholtz resonators.

The end surface of the sheet may be substantially orthogonal to the first and second surfaces. This may allow easier fitting of the sheet to existing adjacent panels.

The panel may be suitable for use in an air inlet cowling of an aircraft nacelle or a different aircraft structure where noise attenuation is required, such as a fuselage.

The first, second and third sheets may be composite sheets or may be metallic, for example aluminium.

According to a second aspect of the invention, there is provided an air inlet cowling for an aircraft nacelle, comprising an acoustic panel according to the first aspect of the invention.

Such an air inlet cowling may have improved sound insulation and may have acoustic panels less susceptible to wear or damage.

The end surface of the sound attenuating sheet may be arranged at an aft end of the inlet cowling. This can allow the acoustic panel to be fitted within existing shapes of aircraft nacelles.

The air inlet cowling may further comprise a seal arranged to abut the acoustic panel at an aft end of the panel.

BRIEF DESCRIPTION OF THE DRAWINGS

Embodiments of the invention will now be described with reference to the accompanying drawings, in which.

DETAILED DESCRIPTION

Figure 1:
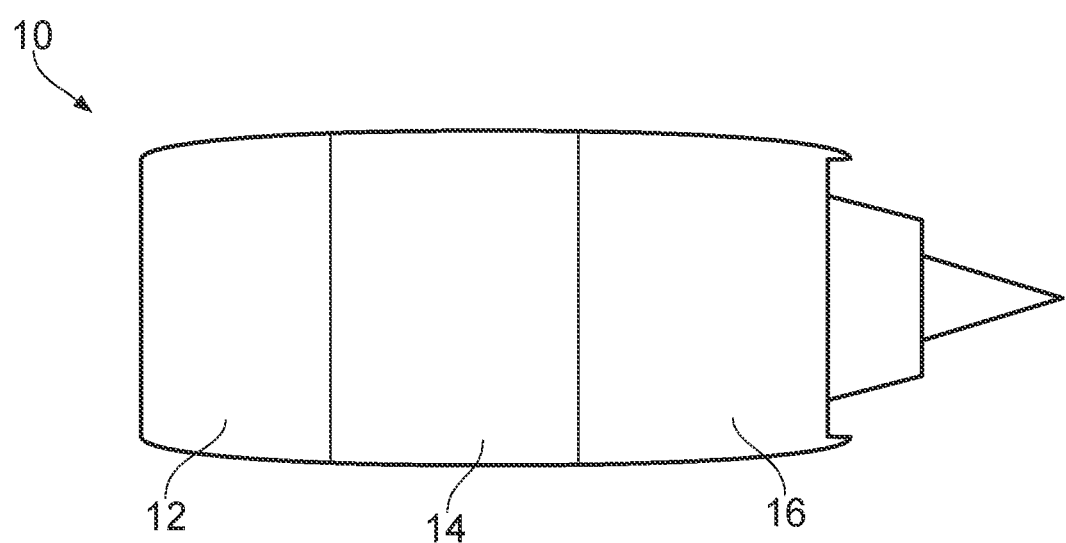
FIG. 1 shows an aircraft nacelle.

FIG. 1 shows an aircraft nacelle 10, the nacelle exterior being formed of three primary parts: an air intake 12, a fan casing 14 and a thrust reverser 16. The purpose of the air intake 12, which may be referred to as an inlet cowling, is to direct airflow into the fan and into the engine and to create an aerosmooth surface for airflow over the exterior of the aircraft nacelle 10. The airflow into the inlet cowling 12 generates a significant amount of noise, and so the inlet cowling 12 should function to attenuate the noise and prevent excessive noise pollution outside of the aircraft.

Figure 2:
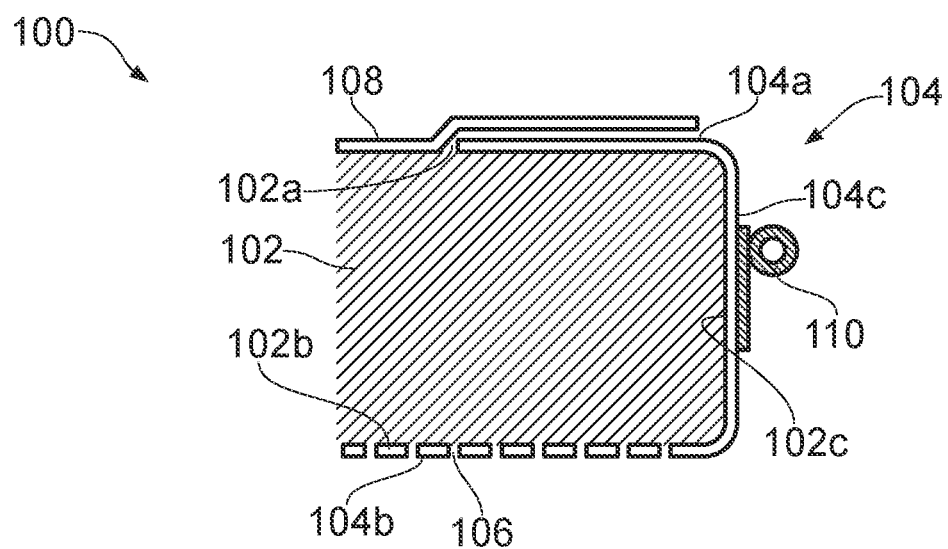
FIG. 2 shows a cross section of an acoustic panel according to an embodiment of the invention.

FIG. 2 shows a cross section of an embodiment of an acoustic panel 100 for use within an inlet cowling. The acoustic panel 100 has a sound attenuating sheet 102, which may be a honeycomb sheet or a different low density material, such as a cellular foam or sponge. The sound attenuating sheet 102 has three surfaces shown in FIG. 2, a top, first surface 102a, a bottom, second surface 102b, and an end surface 102c.

A composite material layer 104 (see FIG. 2), which may be referred to also as a sheet, extends over a portion of the first surface 102a, a portion of the second surface 102b, and over the end surface 102c. The sheet 104 therefore forms a C-shape, and covers at least a portion of all of the three above listed surfaces of the sound attenuating sheet 102.

The sheet 104 can be considered as comprising three portions, a first portion 104a extending over at least a portion of the first surface 102a, a second portion 104b extending over at least a portion of the second surface 102b, and a third portion 104c extending over the end surface 102c. Each respective portion 104a, 104b, 104c of the sheet 104 may lie over and abut the respective surface 102a, 102b, 102c of the sound attenuating sheet 102. The sheet 104 may be attached to the sound attenuating sheet 102 along the entirety of its length by an adhesive or may be attached over only a portion of its length.

A further sheet 108 extends over the top, first surface of the sound attenuating sheet 102 and overlaps at least a portion of the first portion 104a of the sheet 104. The further sheet 108 may be referred to as a stepped or joggled sheet. Within the context of a nacelle, the surface of the acoustic panel 100 formed of the first portion 104a of sheet 104 and, optionally, of the further sheet 108 may be a radially outer surface and a second surface of the acoustic panel 100 opposite the first surface, the second surface of the acoustic panel 100 being formed of the second portion 104b of the sheet 104, may be a radially inner surface.

The second portion 104b of the sheet 104, or at least a portion of the second portion 104b, may comprise perforations or other air holes 106 for allowing fluid communication between the inside of the nacelle and the sound attenuating sheet 102. In the case where the sound attenuating sheet is formed from a honeycomb material, the honeycomb cells may be aligned such that they are open to the second surface of the acoustic panel 100. The air holes 106 may allow the honeycomb cells to function as Helmholtz resonators.

The acoustic panel 100 also comprises a seal 110 adhered to the sheet 104 where the sheet overlaps the end surface 102c of the sound attenuating sheet 102. The seal may optionally be a P-shaped seal but may be a different shape or a different type of close-out feature.

The sheet 104 may be considered as a first and a second sheet, which may form a continuous sheet, and the further, joggled, sheet 108 may be considered as a third sheet.

When the sheet 104 is considered as a first sheet and a second sheet, both the first and the second sheet may be considered as extending over a portion of the end surface of the sound attenuating sheet, and the single continuous sheet may be considered as two sheets that are connected so that a tensile force can be transferred between the two sheets. Alternatively, two sheets may be adhered together or have interleaved plies which are connected so that a tensile force can be transferred between them.

Figure 3:
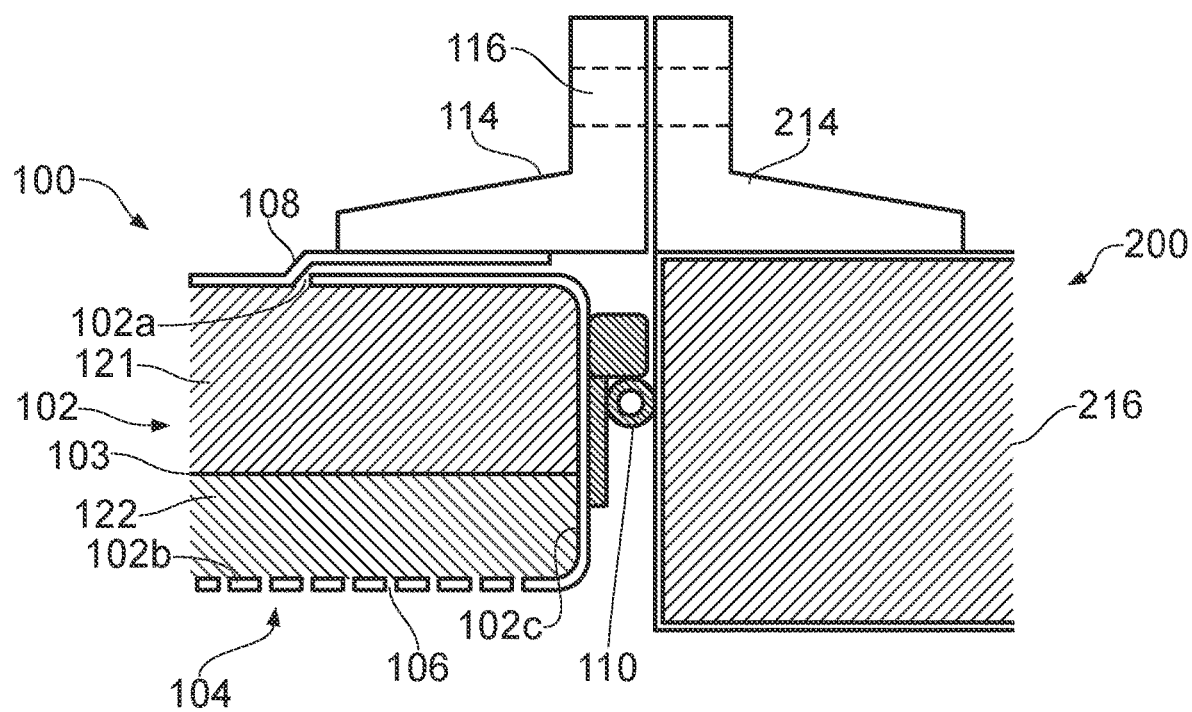
FIG. 3 shows a cross section of the acoustic panel of FIG. 1 arranged within an aircraft nacelle.

FIG. 3 shows an acoustic panel 100 fitted to a fan casing 200 via a flange 114, having a bolt hole 116, for bolting the acoustic panel 100 to a corresponding flange 214 of the fan casing 200. The fan casing 200 may have a corresponding fan casing panel 216.

The sound attenuating sheet 102 of FIG. 3 has two honeycomb portions: a first honeycomb portion 121 and a second honeycomb portion 122, separated by a septum 103. The septum 103 may be air-permeable. A sound attenuating sheet 102 having two honeycomb portions separated by a septum may be referred to as a 2 degrees of freedom sheet, since the two different honeycomb sections may have the same or different sizes of honeycomb cells and thereby may attenuate sounds at different frequencies.

2 degrees of freedom sound attenuating sheets may benefit from the provision of a sheet extending around the sound attenuating sheet as this may prevent the sound attenuating sheet from suffering from tensile forces in a through-thickness direction, i.e. from the first surface 102a to the second surface 102b. This can improve the robustness of the acoustic panel 100 by holding the separate layers of the sound attenuating sheet together strongly.

In FIG. 3, it can also be seen that the seal 110 substantially seals a gap between the acoustic panel 100 and the fan casing panel 216.

Figure 4:
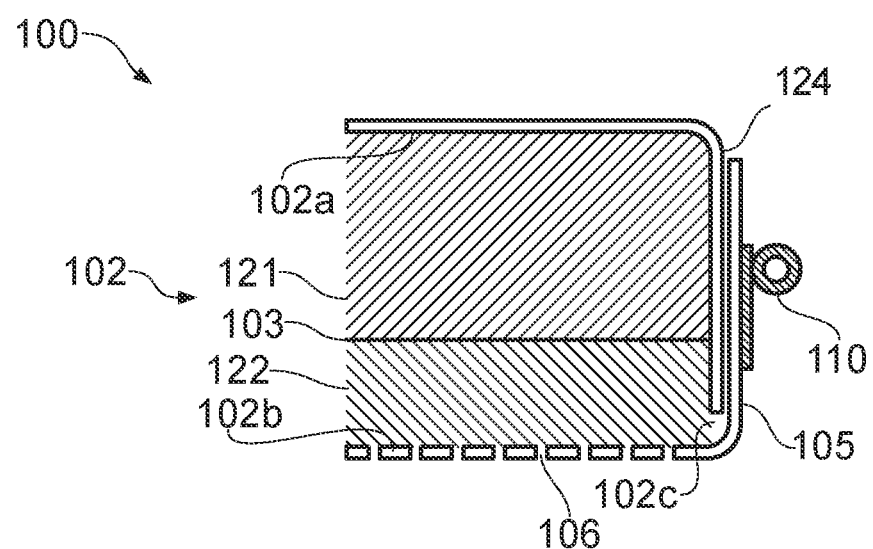
FIG. 4 shows a second embodiment of an acoustic panel according to the invention.

FIG. 4 shows an alternative embodiment for an acoustic panel 100. In this embodiment there are two overlapping sheets at the end surface 102c of the sound attenuating sheet 102. This embodiment has a first sheet 124, which extends over the first surface 102a and over at least a portion of the end surface 102c, and a second sheet 105, which extends over the second surface 102b and over at least a portion of the end surface 102c, overlapping the first sheet 104 in a region where the first sheet 124 extends over the end surface 102c. The first and second sheets 124, 105 may be co-cured or may be adhered together so as to carry a tensile load between them.

Alternatively, the first sheet 124 may overlap the second sheet 105 such that the second sheet 105 is between the first sheet 124 and the end surface 102c and the acoustic panel may still be manufactured and function in substantially the same way.

Figure 5:
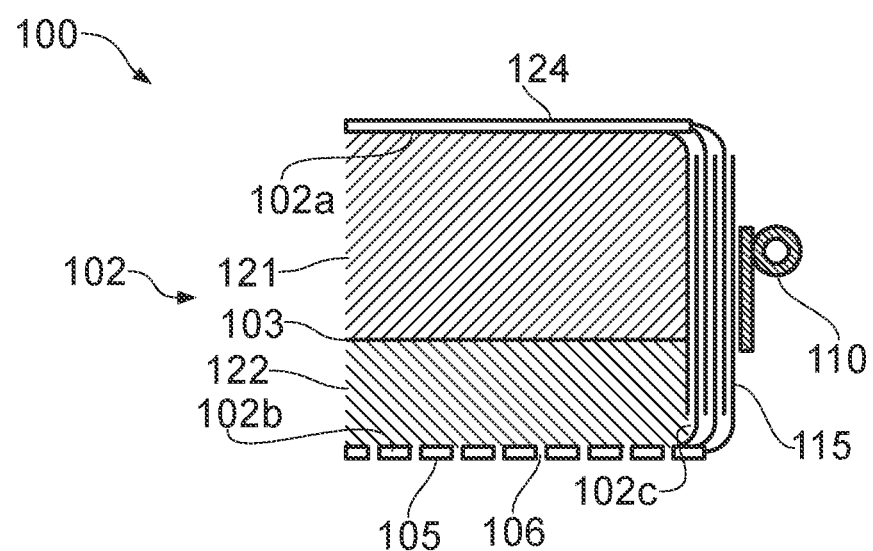
FIG. 5 shows a cross section of a third embodiment of an aircraft panel according to the invention.

FIG. 5 shows a further alternative embodiment, in which individual plies 115 of the first and second sheets 124, 105, which are composite sheets, may be interleaved at the end surface 102c of the acoustic sheet 102. The first and second sheets 124, 105 may thereby be joined in order to carry a tensile load between them.

Figure 6A:
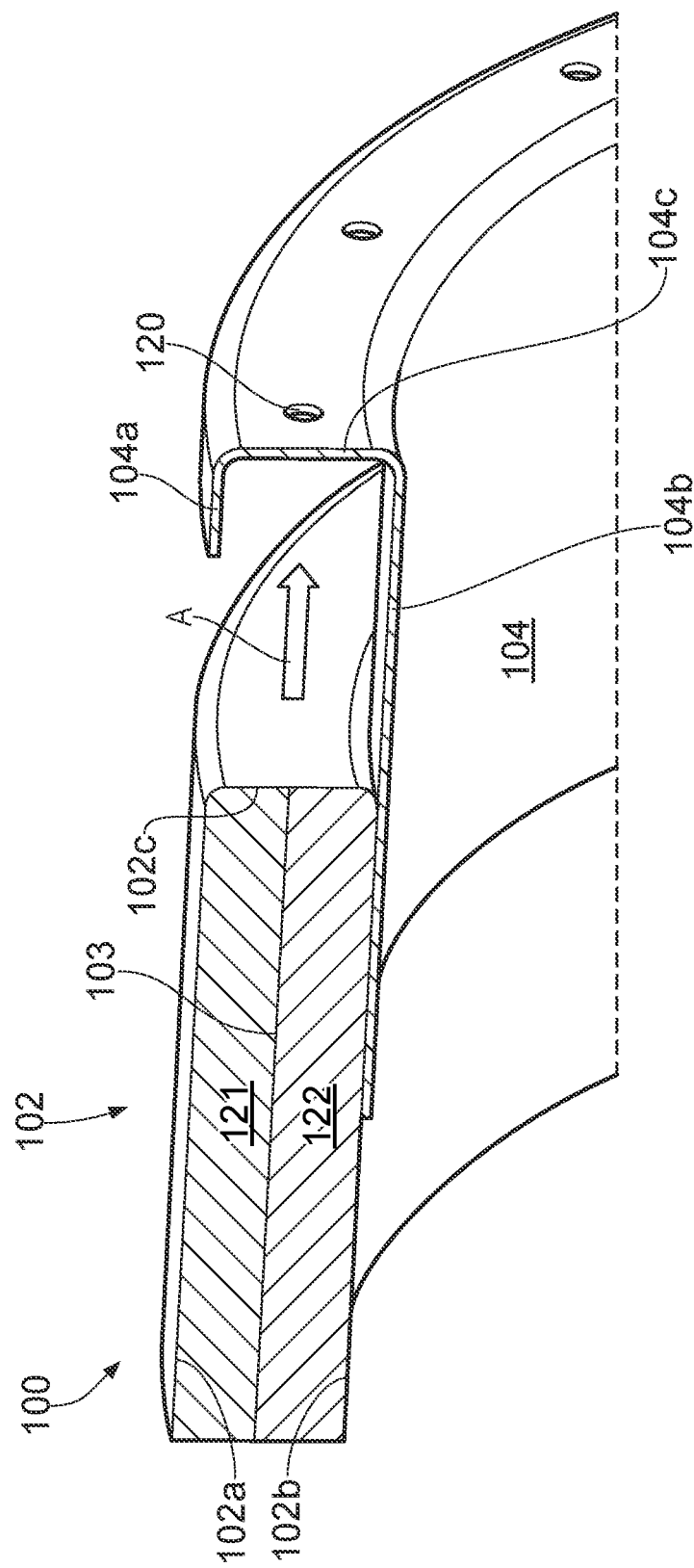
FIGS. 6a, 6b and 6c show sequential steps in the manufacture of an acoustic panel according to embodiments of the invention.

FIG. 6a shows sound attenuating sheet 102 being slid into position, in a direction indicated by arrow A, such that the end surface 102c may abut and mate with the third portion 104c of the sheet 104. The C-shape formed by the first, second, and third portions 104a, 104b, 104c of the sheet 104 is shown and is shaped to mate closely with the corresponding first, second, and end surfaces 102a, 102b, 102c of the sound attenuation sheet 102 respectively.

The sheet 104 has inspection holes 120, arranged such that a manufacturer can observe whether the sound attenuating sheet 102 is correctly seated within the sheet 104 and/or a maintenance person may inspect whether the sound attenuating sheet 102 has suffered damage during use. The inspection holes 120 may be aligned with the septum 103 so that any deterioration or damage to the septum 103 or between the layers of the sound attenuating sheet 102, such as between the first and the second honeycomb portion 121, 122 can be seen via the inspection hole 120.

While the inspection holes 120 are shown only in conjunction with a single continuous sheet 104 extending over the end surface 102c of the sound attenuating sheet 102, it will be understood that the embodiments of FIGS. 4 and 5 may also comprise inspection holes, and that inspection holes may be formed through overlapping or interleaved sheets also.

Figure 6B:
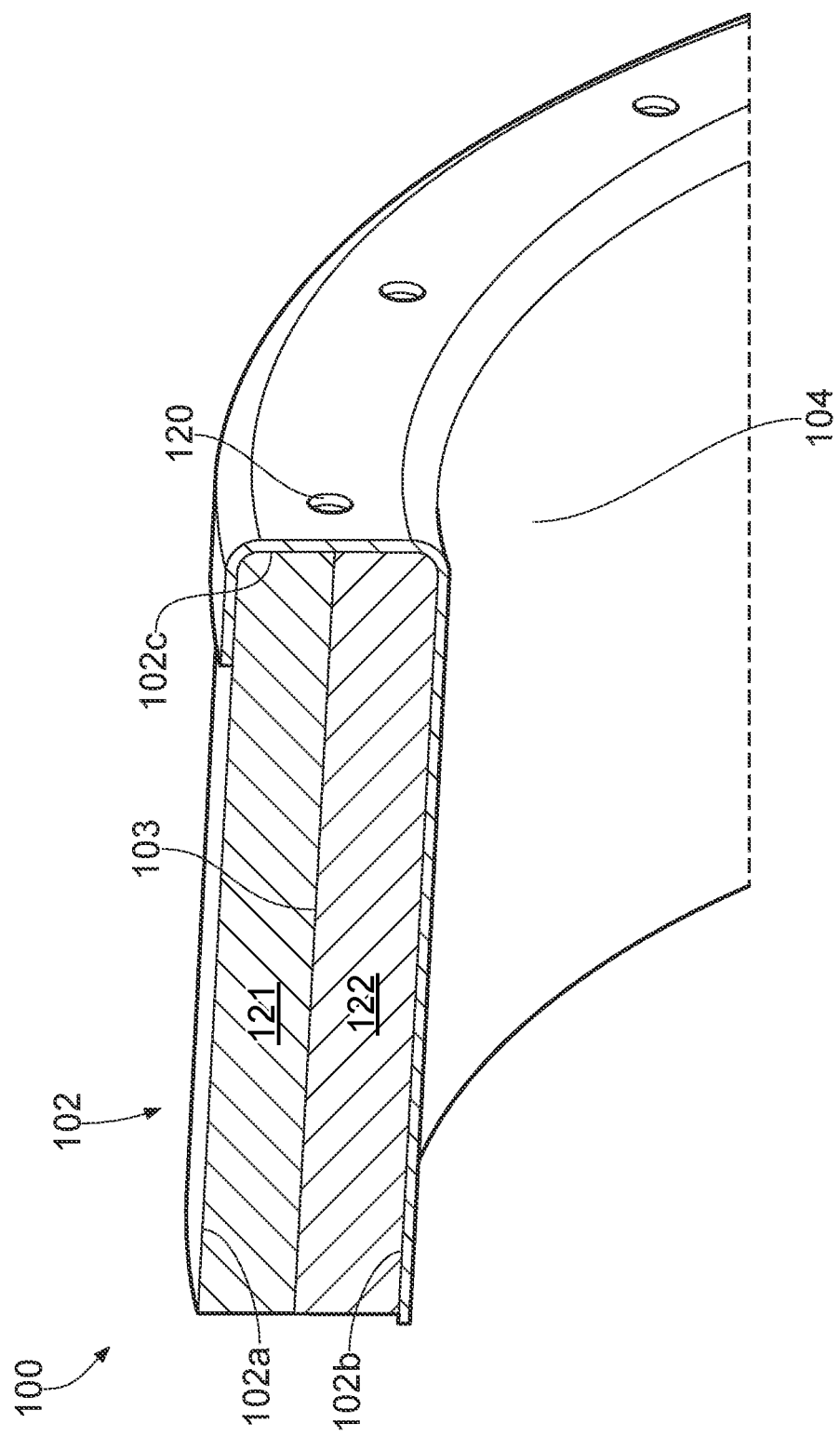

FIG. 6b shows the sound attenuating sheet 102 fitted in position and abutted up to face 102c. Inspection holes 120 may be aligned in this position so that an engineer can check the abutment of the sound attenuating sheet 102 against sheet 104.

Figure 6C:
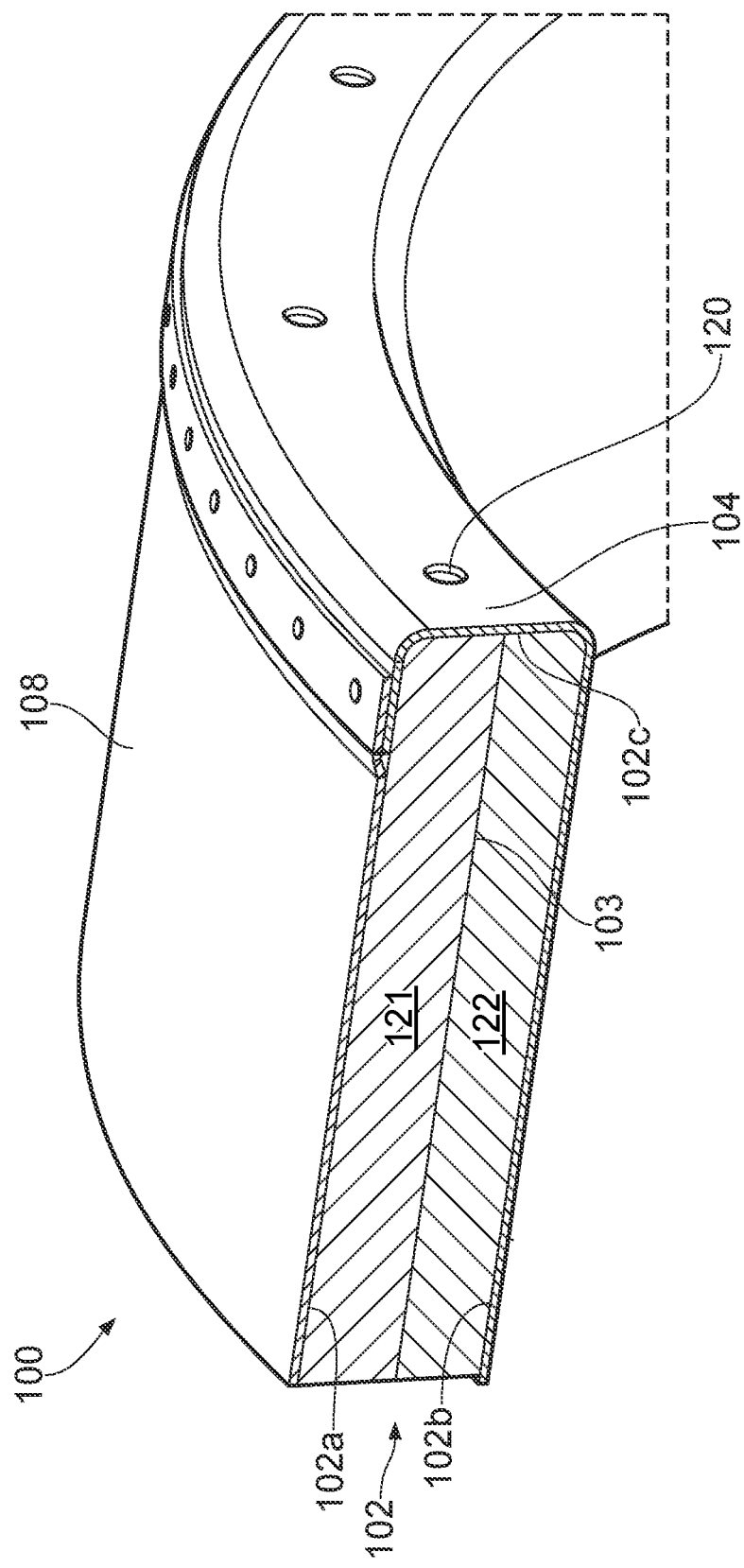

FIG. 6c shows the sound attenuating sheet 102 fitted within the sheet 104 after the joggled sheet 108 has been applied. The sheet 104 and the joggled sheet 108 may be attached to the sound attenuating sheet 102 by bolts or by adhesive.

Although the invention has been described above with reference to one or more preferred embodiments, it will be appreciated that various changes or modifications may be made without departing from the scope of the invention as defined in the appended claims.

The invention claimed is:

1. A curved acoustic panel for an aircraft comprising:
    a sound attenuating sheet comprising two sound attenuating sheet layers, wherein each sound attenuating sheet layer comprises a plurality of cavities and the sound attenuating layers are separated by a septum, the sound attenuating sheet having a first surface, a second surface opposite to the first surface and an end surface connecting the first and second surfaces,
    a first sheet portion extending over and abutting both at least a portion of the first surface and at least a portion of the end surface,
    a second sheet portion extending over and abutting both at least a portion of the second surface and at least a portion of the end surface, and
    a third sheet, separate from the first and second sheet portions, including a stepped portion extending over and directly abutting a portion of the first sheet portion that extends over at least a portion of the first surface of the sound attenuating sheet,
    the third sheet portion further including a planar portion extending over and directly abutting the first surface of the sound attenuating sheet, the planar portion of the third sheet being coplanar with the portion of the first sheet portion,
    wherein the third sheet portion includes a transition portion extending between the planar portion and the stepped portion, the stepped, planar, and transition portions all being the same thickness,
    wherein the first and the second sheet portions form a contiguous sheet such that a tensile force can be transferred between the first and second sheet portions,
    wherein the panel is curved, such that the first surface is a radially outer surface and the second surface is a radially inner surface, the end surface having an annular or arcuate shape.

2. The acoustic panel of claim 1, wherein one or both of the sound attenuating sheet layers comprises a honeycomb sheet.

3. The acoustic panel of claim 1, wherein the first and/or second sheet portions comprise an inspection hole through which the end surface of the sound attenuating sheet is visible.

4. The acoustic panel of claim 1, further comprising a seal attached to the first and/or second sheet portion where the respective sheet portion extends over the end surface of the sound attenuating sheet, the seal being arranged to abut an adjacent panel.

5. The acoustic panel of claim 1, wherein the second sheet portion is air-permeable at a location where it extends over the radially inner surface.

6. The acoustic panel of claim 1, wherein the end surface is substantially orthogonal to the first and second surfaces.

7. The acoustic panel of claim 1, wherein the panel is configured for use in an air inlet cowling of an aircraft nacelle.

8. An air inlet cowling for an aircraft nacelle, comprising an acoustic panel according to claim 1.

9. The air inlet cowling of claim 8, wherein the end surface of the sound attenuating sheet is arranged at an aft end of the inlet cowling.

10. The air inlet cowling of claim 8, further comprising a seal arranged to abut the acoustic panel at an aft end of the panel.

* * * * *